(12) United States Patent
Tsumura

(10) Patent No.: US 6,690,716 B1
(45) Date of Patent: Feb. 10, 2004

(54) CORRELATOR FOR REALIZING LOW CURRENT CONSUMPTION

(75) Inventor: Soichi Tsumura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/518,949

(22) Filed: Mar. 6, 2000

(30) Foreign Application Priority Data

Mar. 12, 1999 (JP) .......................................... 11-065984

(51) Int. Cl.[7] .............................................. H04B 1/707
(52) U.S. Cl. ...................................................... 375/150
(58) Field of Search .............................. 375/140, 142, 375/150; 370/441, 342

(56) References Cited

U.S. PATENT DOCUMENTS 6,243,409 B1 * 6/2001 Fenton et al. ................. 375/137
6,553,059 B1 * 4/2003 Ito ................................ 375/150

FOREIGN PATENT DOCUMENTS

| JP | 4-167171 | 6/1992 |
|---|---|---|
| JP | 8-65205 | 3/1996 |
| JP | 9-321667 | 12/1997 |
| JP | 10-028075 | 1/1998 |
| JP | 10-233751 | 9/1998 |
| JP | 11-008567 | 1/1999 |

OTHER PUBLICATIONS

B. Chen, et al., "A Low Power Consumption Digital Matched Filter Design for Wideband DS–CDMA", The 11th Workshop on Circuits and Systems in Karuizawa, Apr. 20–21, 1998, pp. 181–186.

* cited by examiner

Primary Examiner—Stephen Chin
Assistant Examiner—Kevin Kim
(74) Attorney, Agent, or Firm—Dickstein, Shapiro, Morin & Oshinsky, LLP.

(57) ABSTRACT

A correlator can stop correlation computation on the basis of the value of a despreading code, and decreases the operation ratio of a section operated in accordance with a despreading code pattern to ½ that of a conventional scheme (when spreading is performed by BPSK). This correlator reduces the current consumption to about ½ that of the conventional scheme (when spreading is performed by BPSK) in a case of a sufficiently high spreading ratio by using a common total adder regardless of the despreading code pattern, thereby realizing lower current consumption than the conventional correlator without decreasing the operation speed.

32 Claims, 9 Drawing Sheets

NO SHIFT   SHIFT BY 1 BIT

CORRELATOR FOR REALIZING LOW CURRENT CONSUMPTION

BACKGROUND OF THE INVENTION

1. Field of the Invention

The present invention relates to a correlator and, more particularly, to a correlator which is used for synchronization acquisition and realizes low current consumption.

2. Description of the Prior Art

Recently, mobile communication systems such as a system using portable telephones have become widespread. One of the communication schemes used by such mobile communication systems is CDMA (Code Division Multiple Access).

According to CDMA, on the transmitting side, data is spread by using one of predetermined spreading codes which differ depending on the data to be transmitted, and the spread data is transmitted. On the receiving side, the data is obtained by spreading (so-called despreading) the reception signal by using a spreading code identical to the one used on the transmitting side (to be precise, a code complex conjugate to the spreading code on the transmitting side).

In communication by such CDMA, it is very important to establish synchronization between a terminal station and a base station. A period of time corresponding to the lowest common denominator of the period of a spreading code used in the downlink direction (in which the base station transmits, and the terminal station receives) is required for the terminal station to start synchronization acquisition operation and establish synchronization with the base station. In general, an enormous period of time is required.

Of downlink spreading codes used in W-CDMA (Wide Band CDMA) in the process of being standardized in ARIB (Association of Radio Industries and Businesses) is designed such that some codes with long periods are replaced with spreading codes with shorter periods so as to simplify the above initial synchronization establishment process in the terminal station.

Although such a spreading code has a relatively short period, even this short-period spreading code requires correlation computation corresponding to a certain length (e.g., 256 chips).

As methods of performing correlation computation for such synchronization acquisition, a method using a matched filter and a method using a sliding correlator are available. These two methods will be described below.

FIG. 1 is a block diagram showing the arrangement of a matched filter used as a correlator according to the first prior art.

Referring to FIG. 1, input signals 100 are sequentially input to a tapped shift register 10. The shift register 10 is long enough to store input signals corresponding to a 1-symbol time (generally corresponding to one period of the above short-period spreading code).

In this case, n despreading phase points are contained in a 1-symbol time, and multipliers 21 to 2n respectively multiply signals 101 to 10n output from the respective taps of the shift register 10 and despreading codes $C_n$ to $C_1$ to output the resultant data as multiplication results 201 to 20n. An adder 30 adds the multiplication results 201 to 20n to obtain a despreading result 300.

In the method using this matched filter, since despreading is performed with respect to one phase point every time an input signal corresponding to one sample is input, despreading results with respect to all the phase points can be obtained at high speed. However, this operation consumes a large amount of current for the following reason.

In general, an input signal is a multilevel signal and often handled as a complex signal expressed by I and Q components. This makes it necessary for the shift register 10 to always operate at high speed. The shift register 10 therefore consumes a very large amount of current.

The adder 30 also consumes a large amount of current. This point will be described with reference to FIG. 2.

FIG. 2 shows an example of the internal arrangement of the adder 30 in FIG. 1.

For the sake of simplicity, FIG. 2 shows a case wherein the number of input signals to the adder 30, i.e., the number of taps of the shift register 10, is eight.

As shown in FIG. 2, the adder 30 is comprised of a plurality of adders each for adding two inputs, and outputs the despreading result 300 as a result. Since the adder 30 has such a large-scale arrangement and always operates at high speed, a large amount of current is consumed.

FIG. 3 shows the method using the sliding correlator as the second prior art.

FIG. 3 is a block diagram showing the arrangement of the sliding correlator.

Referring to FIG. 3, a despreading code generator 70 generates a despreading code $C_i$, and a multiplier 40 multiplies this despreading code $C_i$ by an input signal 100 to obtain a signal 110. In addition, an adder 50 and register 60 integrate the signals 110 corresponding to a 1-symbol time. When the signals corresponding to a 1-symbol time are integrated, a register output 130 becomes a despreading result 130 corresponding to one phase point. Therefore, it takes a period of time corresponding to n periods of a despreading code to complete despreading with respect to all the phase points by using this sliding correlator.

Although the current consumption, which poses a problem in the above correlator using the matched filter, can be considerably reduced by using this sliding correlator, a long processing time is required.

As the third prior art, therefore, an arrangement having a plurality of sliding correlators each having the same arrangement as that shown in FIG. 3 (n sliding correlators are required for a despreading time equivalent to that required for the matched filter) may be used.

According to this example, by concurrently operating a plurality of sliding correlators, the processing time required to obtain despreading results corresponding to all the phase points can be shortened to a time equivalent to that required when the matched filter is used.

In this example of concurrently operating the plurality of sliding correlators, however, the processing time is shortened at the expense of current consumption. Although the current consumption can be reduced as compared with the correlator using the matched filter, a problem is left unsolved in terms of current consumption.

As the fourth prior art, the method described in Chin and Furukawa, "Low Power Consumption Design of Wide Band DS-CDMA Digital Matched Filter" (The 11th Circuit and System (Karuizawa) Workshop: on Apr. 20–21, 1998) is available.

FIG. 4 is a block diagram showing the arrangement of a correlator proposed in "Low Power Consumption Design of Wide Band DS-CDMA Digital Matched Filter".

Referring to FIG. 4, reference symbol FFs denotes a register for storing received input spread data; and C, a multiplier for multiplying data from the register FFs by a despreading code. A DMF output indicates an output from this proposed DMF, i.e., a digital matched filter.

The fourth prior art is implemented by shifting a despreading code instead of shifting an input signal by using a shift register. According to the fourth prior art, the current consumption, which poses a problem in the conventional method using the matched filter, can be reduced.

The method using the matched filter has been described as the first prior art; the method using the sliding correlator, as the second prior; the method of concurrently operating the n sliding correlators, as the third prior art; and the method of shifting a despreading code instead of an input signal, as the fourth prior art. In the first prior art, a large amount of current is consumed. In the second prior art, a long processing time is required.

According to the third and fourth prior arts, no problem arises in terms of processing time, and the current consumption can be reduced as compared with the conventional method using the matched filter.

Recently, however, demands have arisen for smaller batteries in accordance with a tendency towards smaller portable telephones. In addition, demands have arisen for portable telephones that consume less current, in order to allow operation for a longer period of time without changing the battery size.

SUMMARY OF THE INVENTION

The present invention has been made in consideration of the above situation in the prior art, and has as its object to provide a correlator which can realize lower current consumption than a conventional correlator without decreasing the operation speed.

In order to achieve the above object, according to the first aspect of the present invention, there is provided a correlator which performs synchronization acquisition by sequentially despreading a spread modulated signal at a plurality of synchronization point candidates, and can stop correlation computation on the basis of the value of a despreading code.

According to the second aspect of the present invention, there is provided a correlator for performing synchronization acquisition by despreading a spread modulated signal having undergone spread spectrum modulation, wherein the spread spectrum modulation is performed by BPSK or QPSK, and despreading is performed according to one of equations given below:

$$\sum_{i=0}^{n-1} C(i) \cdot D(i) = \sum_{i=0}^{n-1} D(i) - 2\sum_{i=0}^{n-1} D(i) \Big|_{C(i)=-1}$$

$$\sum_{i=0}^{n-1} C(i) \cdot D(i) = -\sum_{i=0}^{n-1} D(i) + 2\sum_{i=0}^{n-1} D(i) \Big|_{C(i)=1} \quad \text{and}$$

$$\sum_{i=0}^{n-1} C(i) \cdot D(i) =$$

$$\left\{ \sum_{i=0}^{n-1} D(i) \right\} + \left\{ -\sum_{i=0}^{n-1} D(i) \Big|_{C(i)\neq 1,1} + \left( -j \cdot \sum_{i=0}^{n-1} D(i) \Big|_{C(i)=1,-1} \right) + \left( j \cdot \sum_{i=0}^{n-1} D(i) \Big|_{C(i)=-1,1} \right) + \left( -\sum_{i=0}^{n-1} D(i) \Big|_{C(i)=-1,-1} \right) \right\}$$

where n is the number of despreading phase points contained in a 1-symbol time, C(i) is the despreading code, and D(i) is the signal having undergone the spread spectrum modulation.

As is obvious from the above aspects, according to the present invention, there is provided a correlator which can realize performance equivalent to that of an arrangement designed to concurrently operate n conventional sliding correlators, each shown in FIG. 3, with about ½ the current consumption of the arrangement, when a spreading ratio n is sufficiently high, and spreading/despreading is performed by BPSK.

When the correlator of the present invention is compared with the conventional correlators, the current consumption increases in the order of the second prior art, the present invention, the fourth prior art, third prior art, and first prior art. With regard to the processing time, the present invention and the first, third, and fourth priors are equal, and the second prior art requires the longest processing time. That is, the present invention can realize lower current consumption than the prior arts without decreasing the operation speed.

In other words, according to the present invention, there is provided a correlator which decreases the operation ratio of a section which operates in accordance with a despreading code pattern to ½ that of a conventional scheme (when spreading is performed by BPSK) in despreading a spread modulated signal, and decreases the current consumption to about ½ that of the conventional scheme (when spreading is performed by BPSK) in a case of a sufficiently high spreading ratio by using a common total adder which operates regardless of the despreading code pattern.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF PREFERRED EMBODIMENTS

A few preferred embodiments of the present invention will be described below with reference to the accompanying drawings.

In the following embodiment, the present invention is applied to a mobile station in a CDMA mobile communication system.

Figure 5:
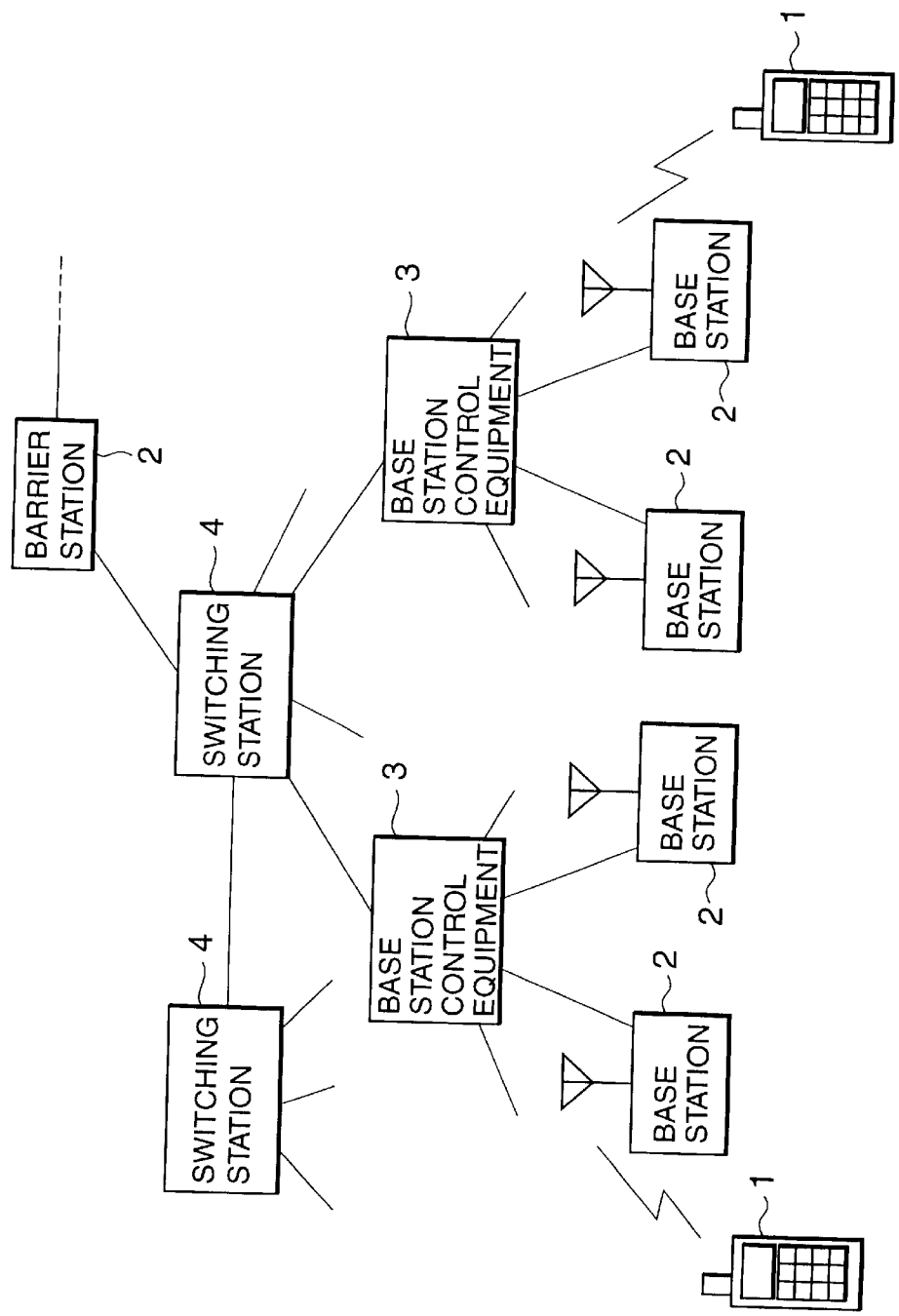
FIG. 5 is a block diagram showing an outline of an example of a CDMA mobile communication system to which a CDMA transmission apparatus according to the present invention is applied.

FIG. 5 is a block diagram showing the schematic arrangement of a CDMA mobile communication system to which a CDMA transmission apparatus according to the present invention is applied.

ATM (Asynchronous Transfer Mode) communication techniques and the like have been applied to base stations, base station control equipment, and switching stations constituting the network side of a mobile communication system in consideration of the diversification (trends toward multimedia) of services provided by the mobile communication system and the efficient use (statistical multiplexing) of transmission paths that connect the respective base stations, base station control equipment, and switching stations.

A mobile station 1 communicates with another mobile station or a terminal apparatus or the like connected to another network through the mobile communication system.

Transmission data from the mobile station 1 is transmitted as communication data to a base station 2 by radio communication. The base station 2 performs various processes for the communication data received from the mobile station 1 or other mobile stations, e.g., assembling the data into ATM cells, and transmits the resultant data to a base station control equipment 3.

In this manner, base stations transmit information in the form of ATM cells within the network regardless of whether the communication data in a radio zone is speech data, image data, or data in other forms. This makes it possible to easily cope with multimedia communication forms.

The base station control equipment 3 routines the ATM cells received from the base station 2 in units of users, and transmits them to switching stations 4 or other subordinate base stations. The switching station 4 routines the ATM cells received from the base station control equipment 3 in units of users, and transmits them to other switching stations or a barrier station 5.

In such ATM cell transmission, ATM cells may be made to flow in a transmission path upon generation of the ATM cells. This obviates the necessity to prepare a transmission path for each predetermined channel. Therefore, a statistical multiplexing effect can be obtained, and transmission paths can be efficiently used. Note that the barrier station 5 is used to relay data to another network.

In transmitting data from the network side to the mobile station 1, the base station 2 performs primary modulation such as QPSK, then performs spread spectrum modulation as secondary modulation, and transmits the resultant data. A correlator of this embodiment can be applied to, for example, the mobile station 1. The mobile station 1 uses this correlator to obtain a correlation by despreading a reception signal from the base station 2 so as to perform synchronization acquisition.

Figure 6:
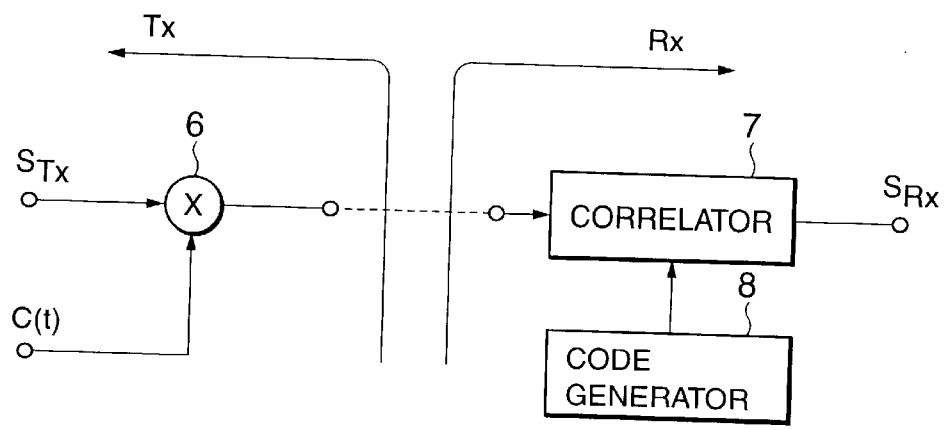
FIG. 6 is a view for explaining operations on the transmitting and receiving sides in spread spectrum modulation.

FIG. 6 is a view for explaining operations on the transmitting and receiving sides in spread spectrum modulation.

Referring to FIG. 6, at Tx, i.e., on the transmitting side (the base station 2 in FIG. 5), a multiplier 6 multiplies a transmission signal $S_{Tx}$ by a spreading code C(t) to perform spread spectrum modulation.

At Rx, i.e., on the receiving side (the mobile station 1 in FIG. 5), a correlator 7 despreads a signal received from Tx by multiplying the signal by a despreading code generated by a code generator 8, thereby obtaining a correlation.

When the multiplier 6 in FIG. 6 is to perform spread spectrum modulation, spread spectrum modulation based on BPSK using a binary code as a spreading code and spread spectrum modulation based on QPSK using a quaternary code as a spreading code are practically used.

Figure 7:
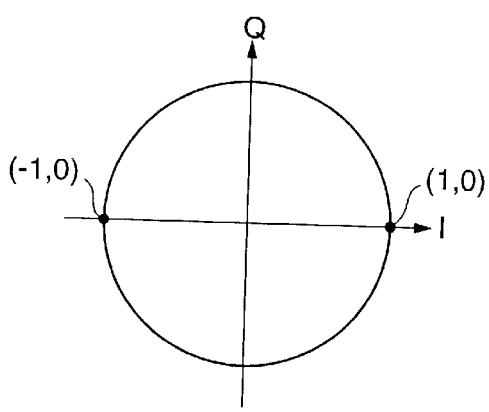
FIG. 7 is a view for explaining how a code is used in spread spectrum modulation based on BPSK.

FIG. 7 is a view for explaining how a code is used in spread spectrum modulation based on BPSK. Referring to FIG. 7, the ordinate represents the Q component; and the abscissa, the I component.

In this spread spectrum modulation based on BPSK, spreading operation is often performed by using a code having two points (1, 0) and (−1, 0) as a spreading code.

Figure 8:
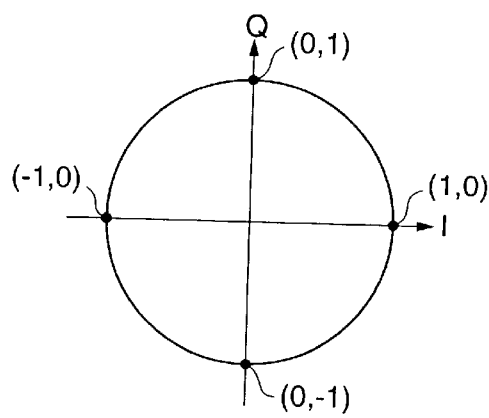
FIG. 8 is a view for explaining how a code is used in spread spectrum modulation based on QPSK.
Figure 9:
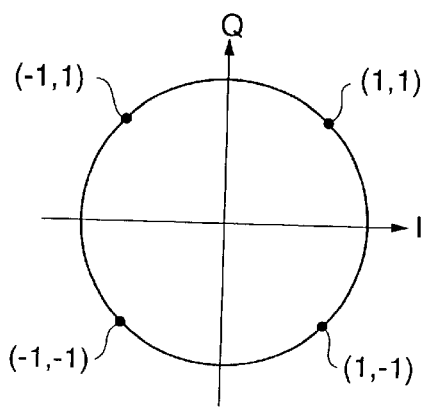
FIG. 9 is a view for explaining how a code is used in spread spectrum modulation based on QPSK.

FIGS. 8 and 9 are views for explaining how codes are used in spread spectrum modulation based on QPSK. Referring to each of FIGS. 8 and 9, the ordinate represents the Q component; and the abscissa, the I component.

In this spread spectrum modulation based on QPSK, as shown in FIG. 9, for example, spreading operation is performed by using code having four points (1, 1), (−1, 1), (−1, −1), and (1, −1) as a spreading code. In despreading operation, for the sake of simple computation or the like, as shown in FIG. 8, for example, the spreading code is rotated through 45° to have four points (1, 0), (0, 1), (−1, 0), and (0, −1), and computation is performed by using this code. A signal rotating section 42 in FIG. 14 performs this rotating operation.

Figure 10:
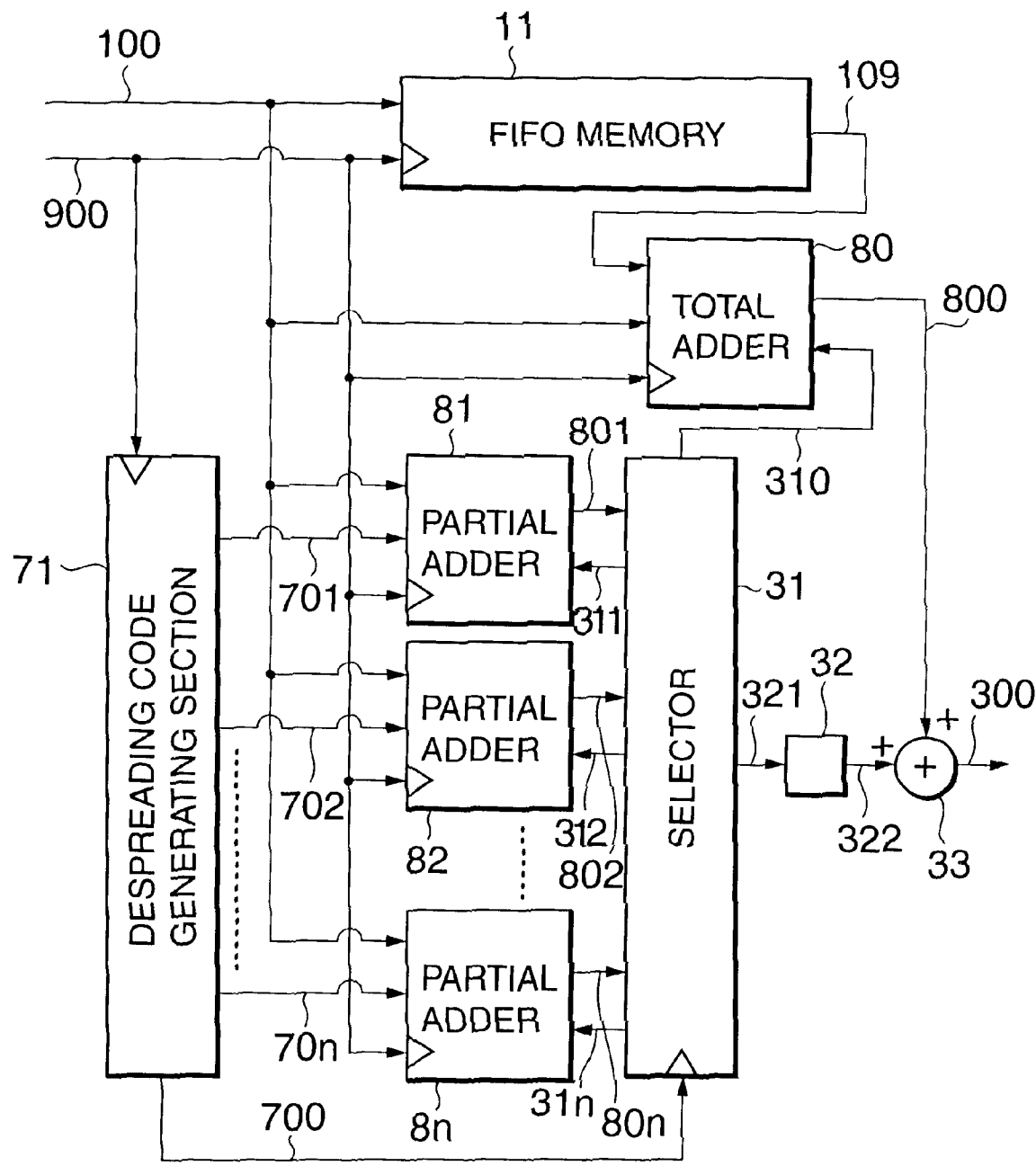
FIG. 10 is a block diagram showing a correlator according to an embodiment of the present invention.

FIG. 10 is a block diagram showing a correlator according to an embodiment of the present invention.

Note that FIG. 10 shows a despreading code generating section 71 corresponding to the code generator 8 in FIG. 6 as well as portions associated with the correlator.

Assume that in this embodiment, spreading/despreading is performed by BPSK, and n spreading chips are added in phase after their phases are matched by a despreading code.

For the sake of simplicity, assume that an input signal 100 is not oversampled, and the frequency of a reference clock 900 is equal to a despreading chip rate.

Referring to FIG. 10, the reception signal 100 is input to a FIFO memory 11, total adder 80, and partial adders 81 to 8n. The reference clock 900 is supplied to each block.

The despreading code generating section 71 generates despreading code sequences 701 to 70n phase-shifted chip by chip on the basis of the reference clock 900, and also outputs a control signal 700 to a selector 31.

The FIFO memory 11 stores n-chip reception signals 100, and outputs a signal n chips ahead of the current reception signal 100 as a FIFO output 109 every time the reception signal 100 is input.

The total adder 80 calculates the sum total of the past n-chip input signals 100 and outputs a total addition result 800. That is, the total adder 80 keeps simply accumulating the input signals 100 from the start of operation to the nth chip. Thereafter, the total adder 80 adds the difference between the currently input signal 100 and the FIFO output 109 to the cumulative result.

This operation is expressed by equation (1). Letting S(k) be the total addition result 800 in a steady state, and D(i) be the input signal 100, the cumulative result can be calculated by equation (1) below:

$$S(k+1) = S(k) + D(k+1) - D(k-n) = \sum_{i=0}^{n-1} D(k+1-i) \quad (1)$$

The partial adders 81 to 8n are respectively prepared for the n-chip input signals 100, and respectively receive the despreading code sequences 701 to 70n phase-shifted chip by chip from the despreading code generating section 71.

The partial adder 81 accumulates only signals, of the n-chip input signals 100, which correspond to a case wherein the despreading code sequence 701 is "1" or "–1".

If the partial adder 81 accumulates signals only when the despreading code sequence 701 is "–1", the partial adder 81 is only required to hold the value accumulated until now and can stop its correlation computation when the despreading code sequence 701 is "1".

A timing signal 311 for resetting the cumulative value in the partial adder 81 is supplied from the selector 31 controlled by the control signal 700.

The explanation of the partial adder, 81 applies to each of the partial adders 82 to 8n.

The selector 31 selects results, from partial addition results 801 to 80n, for which calculations are complete, in accordance with the control signal 700 which is sent from the despreading code generating section 71 and capable of specifying a despreading code generation cycle, and also generates timing signals 311 to 31n for resetting internal cumulative values to the corresponding partial adders.

A frequency multiplier 32 multiplies a partial addition result 321 selected by the selector 31 by –2. An adder 33 then adds a frequency multiplication partial addition result 322 to the total addition result 800 at this time point to obtain a despreading result 300.

Letting C(i)={1, –1} be a despreading code, the despreading result 300 can be given by $$\sum_{i=0}^{n-1} C(i) \cdot D(i) = \sum_{i=0}^{n-1} C(i) \cdot D(i) \bigg|_{C(i)=1} + \sum_{i=0}^{n-1} C(i) \cdot D(i) \bigg|_{C(i)=-1} \quad (2)$$

$$= \sum_{i=0}^{n-1} D(i) \bigg|_{C(i)=1} - \sum_{i=0}^{n-1} D(i) \bigg|_{C(i)=-1}$$

$$= \sum_{i=0}^{n-1} D(i) \bigg|_{C(i)=1} + \sum_{i=0}^{n-1} D(i) \bigg|_{C(i)=-1} -$$

$$\sum_{i=0}^{n-1} D(i) \bigg|_{C(i)=-1} - \sum_{i=0}^{n-1} D(i) \bigg|_{C(i)=-1}$$

$$= \sum_{i=0}^{n-1} D(i) - 2 \sum_{i=0}^{n-1} D(i) \bigg|_{C(i)=-1}$$

The embodiment shown in FIG. 10 implements the computation represented by equation (2).

Figure 1:
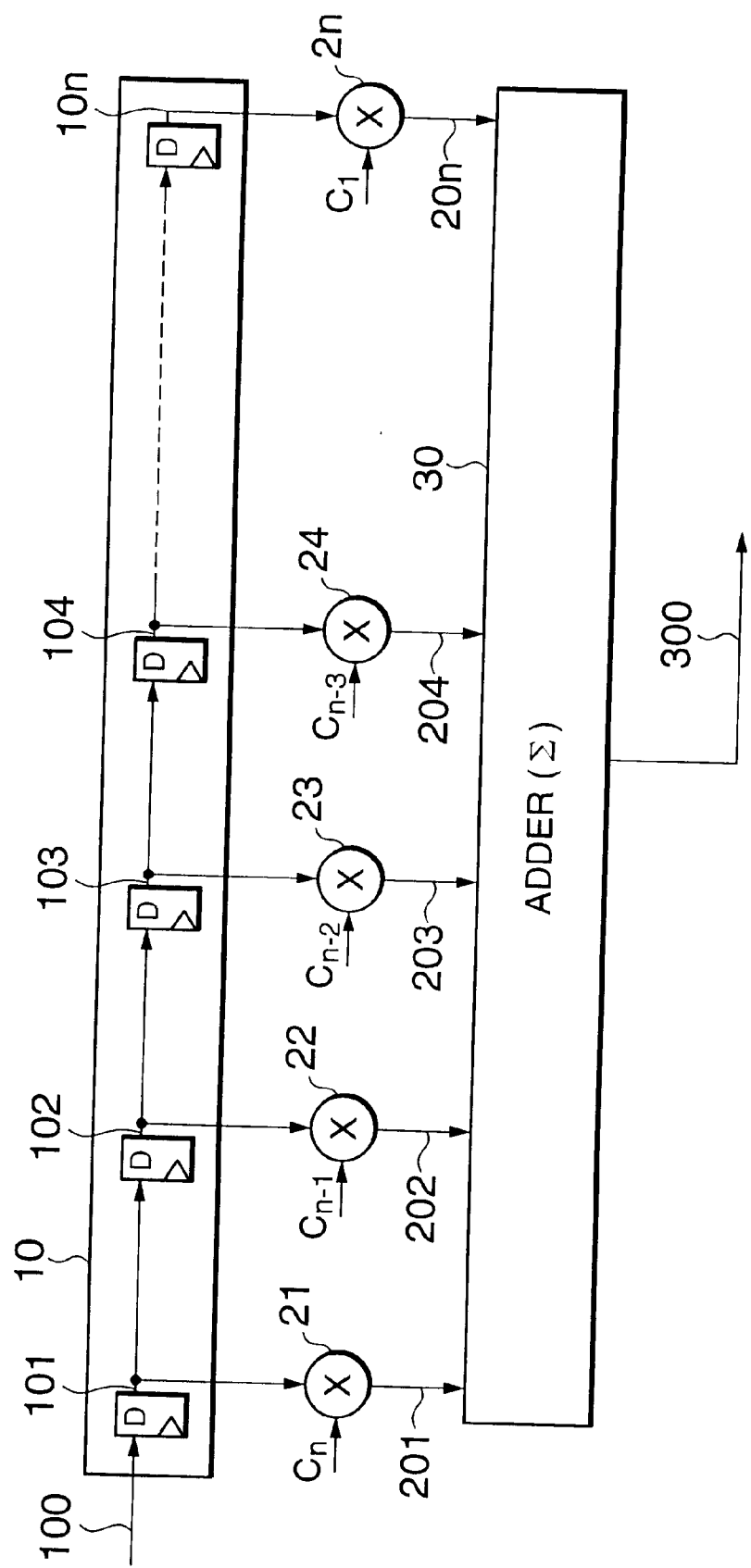
FIG. 1 is a block diagram showing the arrangement of a matched filter as the first prior art used as a correlator.
Figure 2:
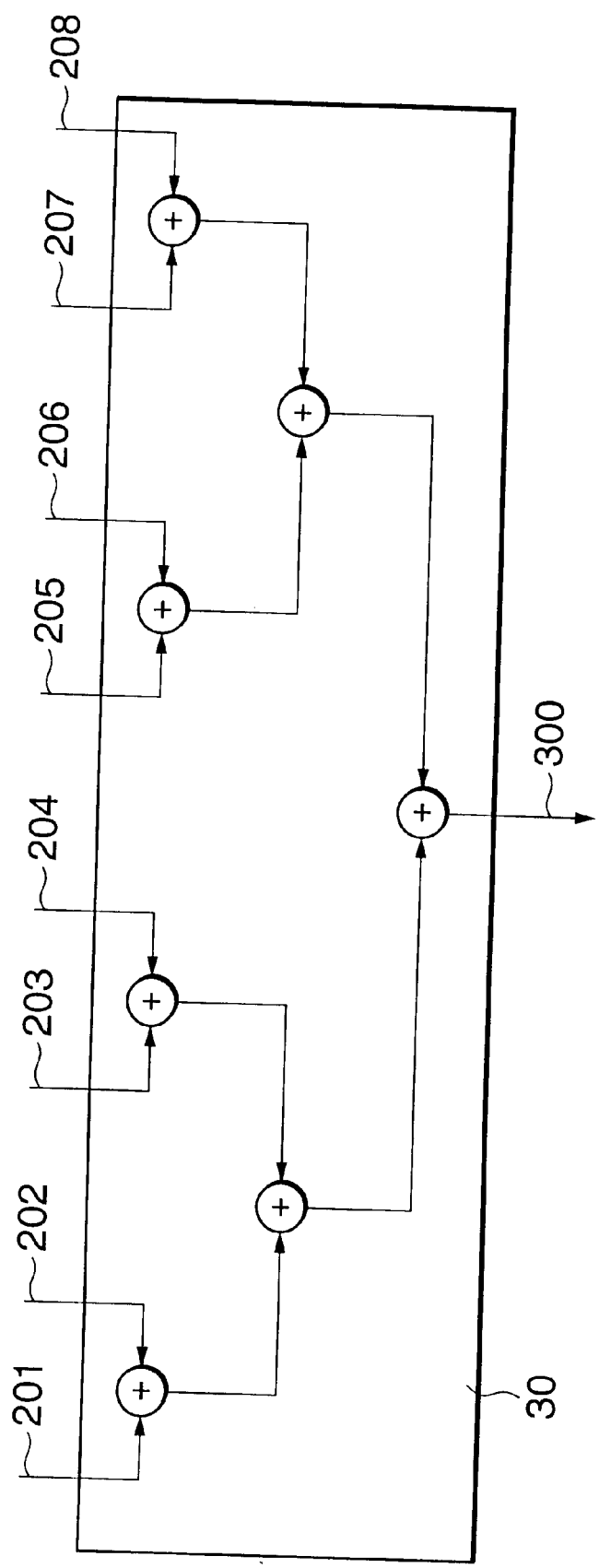
FIG. 2 is a view showing an example of the internal arrangement of an adder in FIG. 1.
Figure 3:
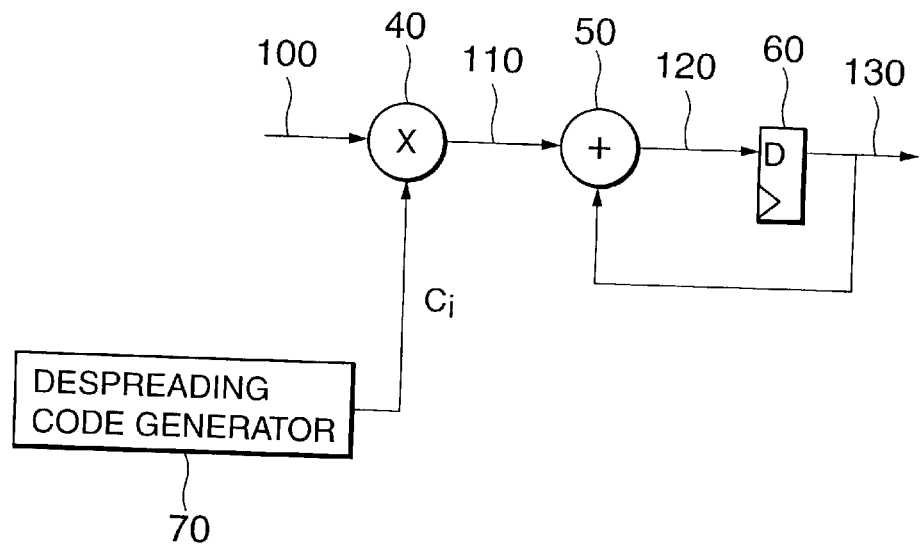
FIG. 3 is a block diagram showing the arrangement of a sliding correlator as the second prior art.
Figure 4:
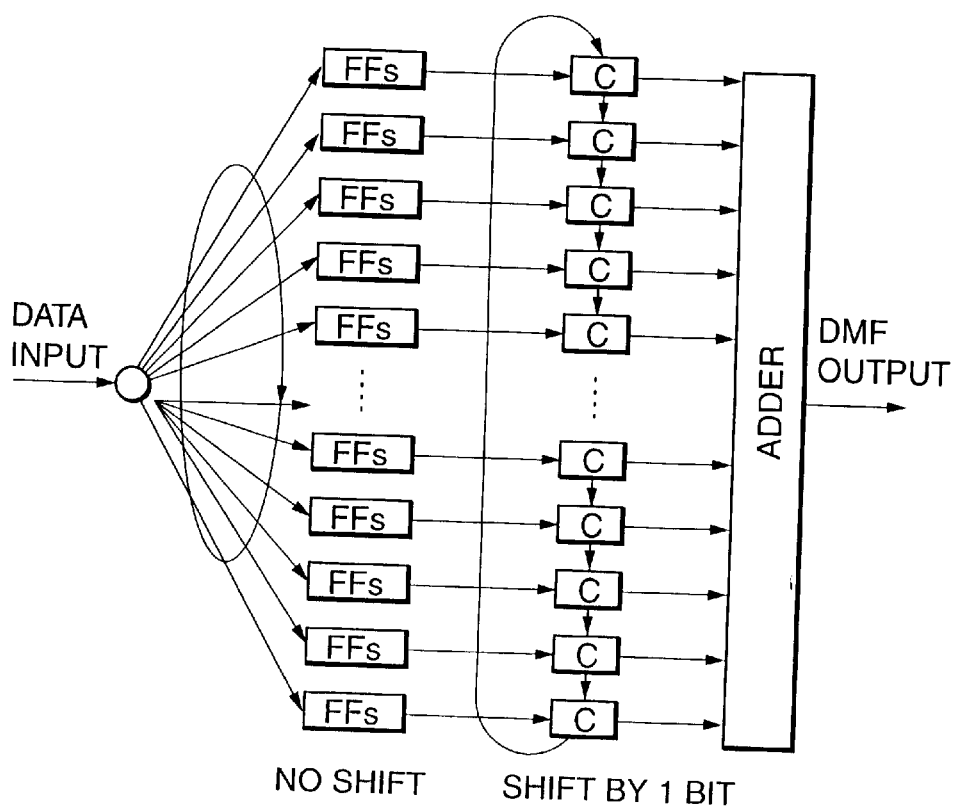
FIG. 4 is a block diagram showing the arrangement of a correlator as the fourth prior art proposed in "Low Power Consumption Design of Wide Band DS-CDMA Digital Matched Filter"

A function equivalent to that realized when n conventional sliding correlators, each shown in FIG. 3, are concurrently operated can be realized by using n partial adders 81 to 8n with an operation frequency of 50% (assuming that the occurrence frequencies of "1" and "–1" of a despreading code are nearly equal) and one total adder 80 with an operation frequency of 100%. Under the condition that a spreading ratio n is sufficiently high, the current consumption can be reduced to almost ½.

The internal arrangement of the total adder 80 in FIG. 10 will be described next.

Figure 11:
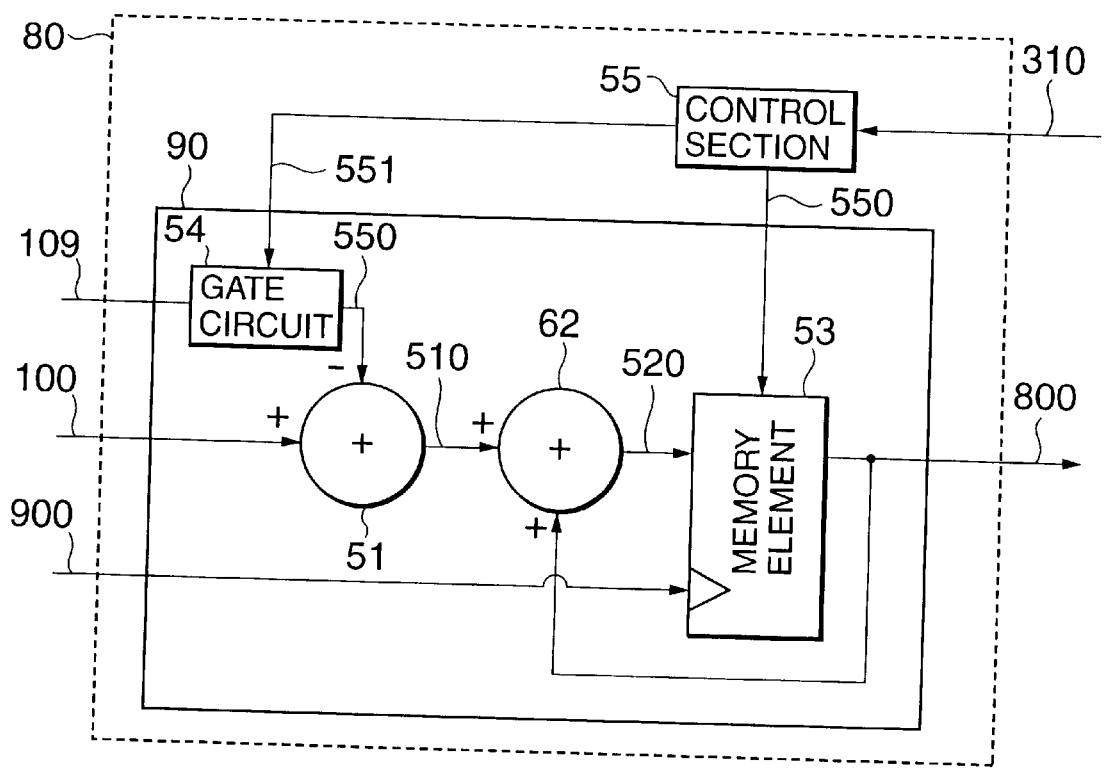
FIG. 11 is a block diagram showing an example of the internal arrangement of a total adder in FIG. 10.

FIG. 11 is a block diagram showing an example of the internal arrangement of the total adder 80 in FIG. 10.

Referring to FIG. 11, a control section 55 receives a control signal 310 from the total adder 80 in FIG. 10 and generates a reset signal 550 and gate signal 551.

A total adding section 90 is comprised of a gate circuit 54, subtracter 51, adder 52, and storage element 53.

The gate circuit 54 receives the gate signal 551 as the gate output 550 and passes/outputs 0 or the FIFO output 109 itself from the FIFO memory 11 in FIG. 10. In an initial state, the gate output 550 is controlled to be kept 0 until the n-chip input signals 100 are accumulated.

The subtracter 51 subtracts the gate output 550 from each input signal 100 and outputs a difference signal 510. The adder 52 and storage element 53 (a latch or flip-flop is generally used) are used to accumulate the difference signals 510 to obtain the total addition result 800 which is the cumulative value corresponding to the n chips in the past.

In the total adder 80 in FIG. 11, the reset signal 550 is generated only once to reset the storage element 53 to 0 immediately before calculation is started. In addition, the gate signals 551 corresponding to the first n chips are output after the start of calculation until the gate signal 550 is set to 0 by the gate circuit 54.

As described above, the total adder 80 shown in FIG. 11 is an IIR (Infinite Impulse Response) type integrator. According to this type, if garbage is contained in a cumulative result owing to some cause, e.g., an operation error due to a short power interruption, external noise, or the like, the subsequent computation result becomes incorrect.

Another example of overcoming this drawback will be described below.

Figure 12:
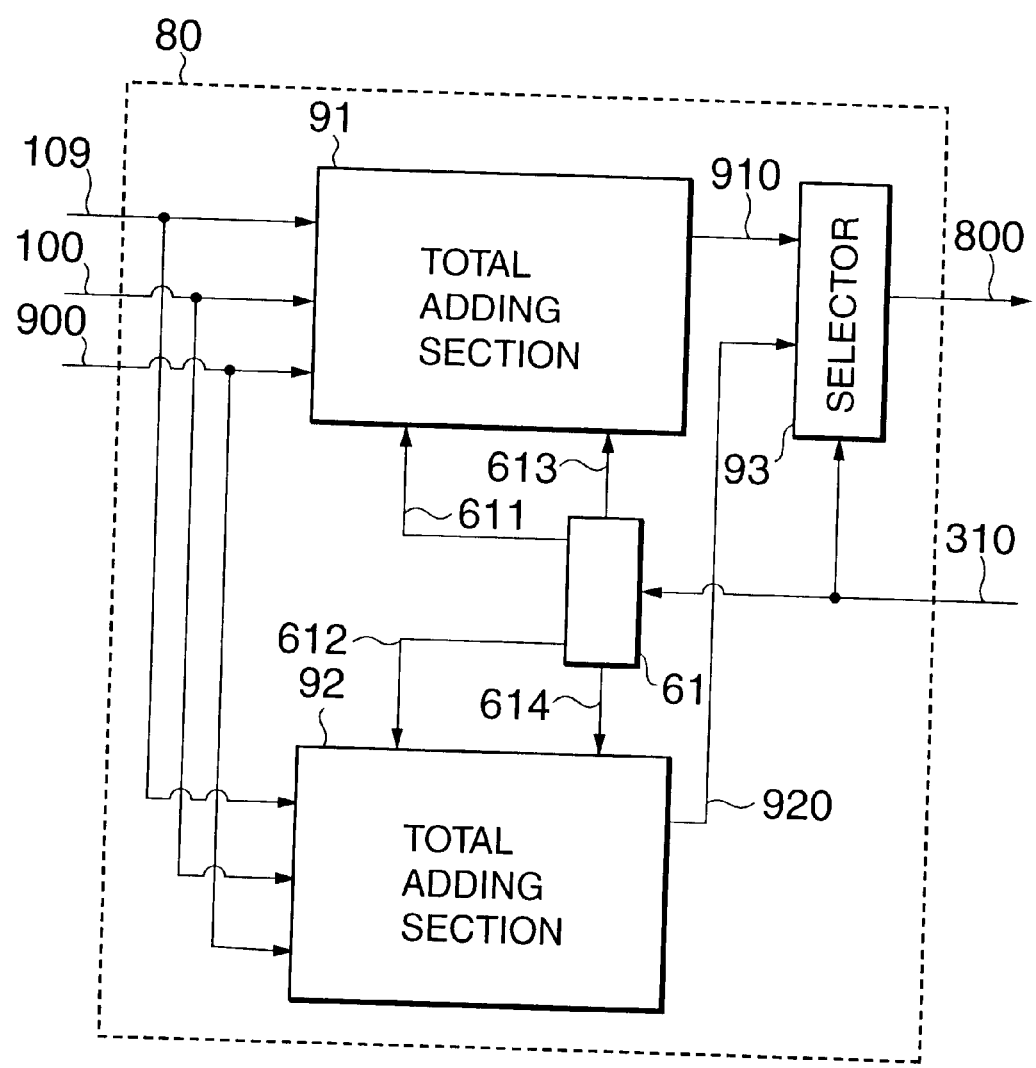
FIG. 12 is a block diagram showing another example of the internal arrangement of the total adder in FIG. 10, which differs from that shown in FIG. 11.

FIG. 12 is a block diagram showing another example of the internal arrangement of the total adder 80 in FIG. 10, which differs from the example shown in FIG. 11.

Referring to FIG. 12, each of total adding sections 91 and 92 has the same arrangement as that of the total adding section 90. These sections will be described below.

Each of the total adding sections 91 and 92 is comprised of a gate circuit, subtracter, adder, and storage element, like the total adding section 90 in FIG. 11.

The gate circuit in the total adding section 91 or 92 receives a gate signal 611 or 612 from a control section 61, and passes/outputs 0 or the FIFO output 109 itself from the FIFO memory 11 in FIG. 10. In an initial state, the gate output from the gate circuit in the total adding section 91 or 92 is controlled to be kept 0 until the n-chip input signals 100 are accumulated.

The subtracter in the total adding section 91 or 92 subtracts the gate output from each input signal 100 and outputs a difference signal. Thereafter, the adder and storage element in the total adding section 91 or 92 accumulate the difference signals to obtain an output 910 or 920 which is a cumulative value corresponding to the n chips in the past.

In the case shown in FIG. 12, the total adding sections 91 and 92 are alternately reset by reset signals 613 and 614 from the control section 61 to be restored to an initial state.

Even if, therefore, cumulative results become incorrect due to some cause, since these sections are periodically restored to the initial state, the propagation of errors, which is described in the example shown in FIG. 11, can be stopped.

More specifically, the control section 61 receives the control signal 310 from the selector 31 in FIG. 10, resets the total adding section 91 by the reset signal 613, and masks the FIFO output 109 input to the total adding section 91 by using the gate signal 611 during the subsequent n chips.

Since the output 910 from the total adding section 91 becomes effective n chips after reset operation, a selector 93 selects the output 910 as the total addition result 800 with respect to the subsequent n chips.

The total adding section 92 is controlled by the reset signal 614 and gate signal 612 in the same manner as described above. However, the operation timing of the total adding section 92 is delayed with respect to that of the total adding section 91 by n chips. That is, the total adding section 92 is reset at the instant when the output 910 from the total adding section 91 becomes effective, and the FIFO output 109 with respect to the total adding section 92 is masked during an n-chip interval in which the output 910 from the total adding section 91 is kept effective.

When the output 920 from the total adding section 92 becomes effective, the total adding section 91 is reset, and the selector 93 selects the output 920 as the total addition result 800. By repeating the above procedure, the propagation of an error, which is described with reference to FIG. 11, can be stopped by the time 2n chips are output at the maximum.

An example of the internal arrangement of each of the partial adders 81 to 8n shown in FIG. 10 will be described next. Since the arrangement of each of the partial adders 82 to 8n is the same as that of the partial adder 81, the partial adder 81 will be described below as a representative example.

Figure 13:
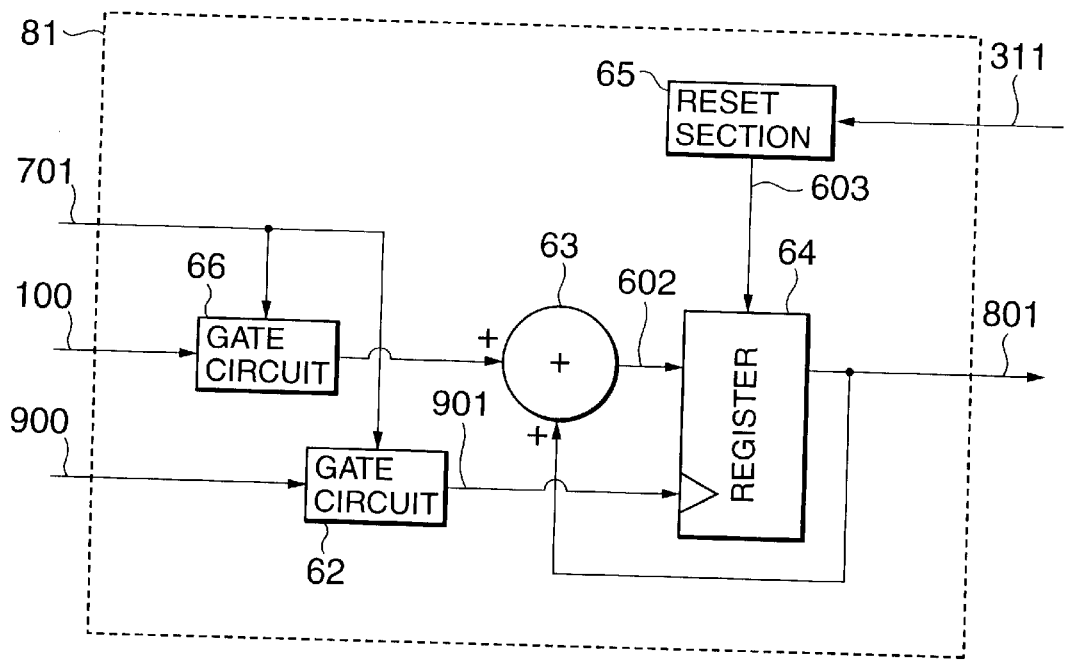
FIG. 13 is a block diagram showing an example of the internal arrangement of a partial adder in FIG. 10, and more specifically, an application in which spreading/despreading is performed by BPSK.

FIG. 13 is a block diagram showing an example of the internal arrangement of the partial adder 81 in FIG. 10.

Referring to FIG. 13, the reception signal 100 and operation clock 900 are blocked or passed by gate circuits 66 and 62 controlled by the despreading code 701.

The gate circuits 66 and 62 pass signals only when the despreading code 701 is −1 (C(i)=−1), and block the signals when the despreading code 701 is 1 (C(i)=1).

An adder 63 and register 64 accumulate output signals from the gate circuit 66. The register 64 is reset at every symbol cycle by a reset signal 603 from a reset section 65 controlled by the timing signal 311 from the selector 31 in FIG. 10.

An output from the partial adder 81 can be obtained by extracting the output signal 801 immediately before the register 64 is reset.

That is, the partial adder 81 almost stops its operation while the despreading code 701 from the despreading code generating section 71 is 1, and the operation ratio decreases to about ½, thus reducing the current consumption.

In the above embodiment, spreading/despreading is performed by BPSK. However, the present invention is not limited to this, and can be applied to, for example, a case wherein spreading/despreading is performed by QPSK.

An embodiment in which the present invention is applied to a case wherein spreading/despreading is performed by QPSK will be described below.

Since the basic arrangement of this embodiment is also the same as that shown in FIG. 10, the embodiment will be described with reference to FIG. 10.

A despreading result in the case of QPSK can be calculated by $$\sum_{i=0}^{n-1} C(i) \cdot D(i) = \sum_{i=0}^{n-1} C(i) \cdot D(i) \Big|_{C(i)=1,1} + \sum_{i=0}^{n-1} C(i) \cdot D(i) \Big|_{C(i)=1,-1} + \quad (3)$$

$$\sum_{i=0}^{n-1} C(i) \cdot D(i) \Big|_{C(i)=-1,1} + \sum_{i=0}^{n-1} C(i) \cdot D(i) \Big|_{C(i)=-1,-1}$$

$$= \sum_{i=0}^{n-1} D(i) \Big|_{C(i)=1,1} + \left(-j \cdot \sum_{i=0}^{n-1} D(i) \Big|_{C(i)=1,-1}\right) +$$

$$\left(j \cdot \sum_{i=0}^{n-1} D(i) \Big|_{C(i)=-1,1}\right) + \left(-\sum_{i=0}^{n-1} D(i) \Big|_{C(i)=-1,-1}\right)$$

$$= \sum_{i=0}^{n-1} D(i) \Big|_{C(i)=1,1} + \sum_{i=0}^{n-1} D(i) \Big|_{C(i)\neq 1,1} - \sum_{i=0}^{n-1} D(i) \Big|_{C(i)\neq 1,1}$$

$$\left(-j \cdot \sum_{i=0}^{n-1} D(i) \Big|_{C(i)=1,-1}\right) + \left(j \cdot \sum_{i=0}^{n-1} D(i) \Big|_{C(i)=-1,1}\right) +$$

$$\left(-\sum_{i=0}^{n-1} D(i) \Big|_{C(i)=-1,-1}\right)$$

$$= \left\{\sum_{i=0}^{n-1} D(i)\right\} + \left\{-\sum_{i=0}^{n-1} D(i) \Big|_{C(i)\neq 1,1} + \right.$$

$$\left(-j \cdot \sum_{i=0}^{n-1} D(i) \Big|_{C(i)=1,-1}\right) + \left(j \cdot \sum_{i=0}^{n-1} D(i) \Big|_{C(i)=-1,1}\right) +$$

$$\left.\left(-\sum_{i=0}^{n-1} D(i) \Big|_{C(i)=-1,-1}\right)\right\}$$

This embodiment implements the computation expressed by equation (3).

In this embodiment, therefore, partial adders 81 to 8n must operate when C(i) is not "1, 1".

As described above, this embodiment has the same arrangement as that shown in FIG. 10. In the embodiment based on BPSK, however, the coefficient of the frequency multiplier 32 in FIG. 10 is −2, whereas in this embodiment, this coefficient is −1. In addition, the internal arrangement of each of the partial adders 81 to 8n in this embodiment differs from that in the embodiment based on BPSK.

The internal arrangement of each of the partial adders 81 to 8n in this embodiment will be described below.

In this embodiment as well, the arrangement of each of partial adders 82 to 8n is the same as that of the partial adder 81, and hence the arrangement of the partial adder 81 will be described as a representative example.

Figure 14:
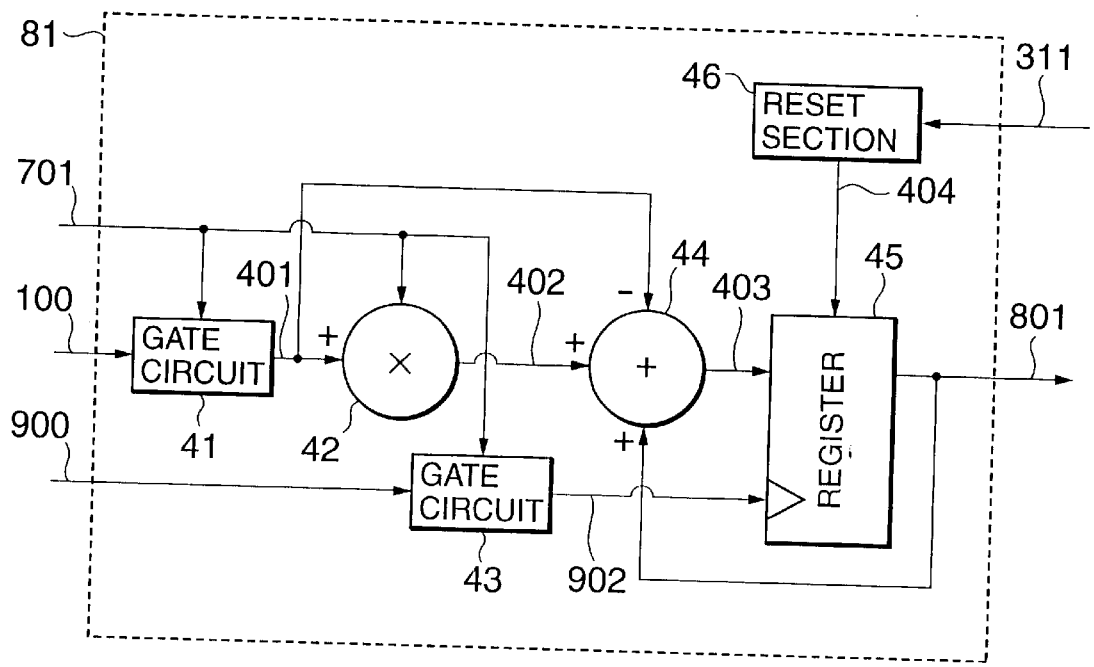
FIG. 14 is a block diagram showing an example of the internal arrangement of a partial adder in FIG. 10, and more specifically, an application in which spreading/despreading is performed by QPSK.

FIG. 14 is a block diagram showing an example of the internal arrangement of the partial adder 81 in FIG. 10, and more specifically, an application in which spreading/despreading is performed by QPSK.

Referring to FIG. 14, a reception signal 100 and operation clock 900 are blocked or passed by gate circuits 41 and 43 controlled by a despreading code 701.

The gate circuits 41 and 43 pass signals only when (C(i)=1, −1), (C(i)=−1, −1), or (C(i)=−1, 1), i.e., the despreading code 701 takes a value other than "1, 1", and block the signals when the despreading code 701 is "1, 1" ((C) (i)=1, 1).

A signal rotating section 42 performs rotating operation (−90°, 180°, +90°) corresponding to the despreading code 701, and outputs a rotation result 402. An adder 44 and register 45 then accumulate the result obtained by subtracting a signal 401 before rotation from the rotation result 402.

The register 45 is reset at every symbol cycle by a reset signal 404 from a reset section 46 controlled by the timing signal 311 from the selector 31 in FIG. 10.

An output from the partial adder 81 can be obtained by extracting an output signal 801 immediately before the register 45 is reset.

That is, the partial adder 81 in this embodiment almost stops its operation while the despreading code 701 from the despreading code generating section 71 in FIG. 10 is "1, 1", and the operation ratio decreases to about ¾, thus reducing the current consumption.

Even in a case wherein spreading/despreading is performed by, for example, QPSK instead of BPSK, the current consumption can be reduced to ¾ by performing partial addition with respect to three states of all the states, i.e., four states, of a despreading code, although the circuit size increases.

In each embodiment described above, spreading/despreading is performed by BPSK and QPSK. However, the present invention is not limited to this.

In addition, in each embodiment described above, oversampling is not performed. Obviously, however, the present invention can be applied to a case wherein oversampling is performed.

In the above embodiment in which spreading/despreading is performed by BPSK, the computation expressed by equation (2) is implemented. However, the present invention is not limited to this, and the computation expressed by equation (4) may be implemented. This applies to the case wherein spreading/despreading is performed by QPSK.

$$\sum_{i=0}^{n-1} C(i) \cdot D(i) = \sum_{i=0}^{n-1} C(i) \cdot D(i) \Big|_{C(i)=1} + \sum_{i=0}^{n-1} C(i) \cdot D(i) \Big|_{C(i)=-1} \quad (4)$$

$$= \sum_{i=0}^{n-1} D(i) \Big|_{C(i)=1} - \sum_{i=0}^{n-1} D(i) \Big|_{C(i)=-1}$$

$$= \sum_{i=0}^{n-1} D(i) \Big|_{C(i)=1} + \sum_{i=0}^{n-1} D(i) \Big|_{C(i)=1} -$$

$$\sum_{i=0}^{n-1} D(i) \Big|_{C(i)=1} - \sum_{i=0}^{n-1} D(i) \Big|_{C(i)=-1}$$

$$= -\sum_{i=0}^{n-1} D(i) + 2\sum_{i=0}^{n-1} D(i) \Big|_{C(i)=1}$$

What is claimed is:

1. A correlator for performing synchronization acquisition comprising:
   means for sequentially despreading a spread modulated signal at a plurality of synchronization point candidates, and
   means for stopping correlation computation on the basis of a value of a despreading code sequence.

2. A correlator for performing synchronization acquisition by sequentially despreading a spread modulated signal at a plurality of synchronization point candidates, comprising means for stopping correlation computation on the basis of a value of a despreading code, wherein said means for stopping correlation computation independently computes a despreading computation result in advance by using an arbitrary value selected from values which a despreading code can take, thereby stopping the correlation computation when the despreading code takes the selected arbitrary value.

3. A correlator for performing synchronization acquisition by despreading a spread modulated signal having undergone spread spectrum modulation, wherein the spread spectrum modulation is performed by BPSK, and despreading is performed according to an equation given below:

$$\sum_{i=0}^{n-1} C(i) \cdot D(i) = \sum_{i=0}^{n-1} D(i) - 2\sum_{i=0}^{n-1} D(i) \Big|_{C(i)=-1}$$

where n is the number of despreading phase points contained in a 1-symbol time, C(i) is the despreading code, and D(i) is the signal having undergone the spread spectrum modulation.

4. A correlator according to claim 3, further comprising:
   a total adder for computing $$\sum_{i=0}^{n-1} D(i)$$

of a right-hand-side term of the equation $$\sum_{i=0}^{n-1} C(i) \cdot D(i) = \sum_{i=0}^{n-1} D(i) - 2\sum_{i=0}^{n-1} D(i) \Big|_{C(i)=-1};$$

a partial adder for computing $$\sum_{i=0}^{n-1} D(i) \Big|_{C(i)=-1}$$

of the right-hand-side term of the equation $$\sum_{i=0}^{n-1} C(i) \cdot D(i) = \sum_{i=0}^{n-1} D(i) - 2\sum_{i=0}^{n-1} D(i) \Big|_{C(i)=-1};$$

a frequency multiplier for multiplying an output from said partial adder by −2; and
an adder for adding an output from said total adder and an output from said frequency multiplier.

5. A correlator according to claim 4, wherein said total adder subtracts an input signal, of the spread modulated signals, which is input n chips ahead of a current input signal, from the current signal, and adds the subtraction result to a sum total of the spread modulated signals corresponding to n chips in the past, thereby computing latest $$\sum_{i=0}^{n-1} D(i).$$

6. A correlator according to claim 4, wherein said total adder is of an IIR type.

7. A correlator according to claim 4, wherein said total adder comprises two IIR type total adders.

8. A correlator for performing synchronization acquisition by despreading a spread modulated signal having undergone spread spectrum modulation, wherein the spread spectrum modulation is performed by BPSK, and despreading is performed according to an equation given below:

$$\sum_{i=0}^{n-1} C(i) \cdot D(i) = -\sum_{i=0}^{n-1} D(i) + 2\sum_{i=0}^{n-1} D(i) \Big|_{C(i)=1}$$

wherein n is the number of despreading phase points contained in a 1-symbol time, C(i) is the despreading code, and D(i) is the signal having undergone the spread spectrum modulation.

9. A correlator according to claim 8, further comprising:
a total adder for computing $$\sum_{i=0}^{n-1} D(i)$$

of a right-hand-side term of the equation $$\sum_{i=0}^{n-1} C(i) \cdot D(i) = -\sum_{i=0}^{n-1} D(i) + 2\sum_{i=0}^{n-1} D(i) \bigg|_{C(i)=1};$$

a partial adder for computing $$\sum_{i=0}^{n-1} D(i) \bigg|_{C(i)=1}$$

of the right-hand-side term of the equation $$\sum_{i=0}^{n-1} C(i) \cdot D(i) = -\sum_{i=0}^{n-1} D(i) + 2\sum_{i=0}^{n-1} D(i) \bigg|_{C(i)=1}$$

a frequency multiplier for multiplying an output from said partial adder by 2; and a subtracter for subtracting an output from said total adder from an output from said frequency multiplier.

10. A correlator for performing synchronization acquisition by dispreading a spread modulated signal having undergone spread spectrum modulation, wherein the spread spectrum modulation is performed by QPSK, and dispreading is performed according to an equation given below:

$$\sum_{i=0}^{n-1} C(i) \cdot D(i) =$$

$$\left\{ \sum_{i=0}^{n-1} D(i) \right\} + \left\{ -\sum_{i=0}^{n-1} D(i) \bigg|_{C(i) \neq 1,1} + \left( -j \cdot \sum_{i=0}^{n-1} D(i) \bigg|_{C(i)=1,-1} \right) + \right.$$

$$\left. \left( j \cdot \sum_{i=0}^{n-1} D(i) \bigg|_{C(i)=-1,1} \right) + \left( -\sum_{i=0}^{n-1} D(i) \bigg|_{C(i)=-1,-1} \right) \right\}$$

where n is the number of dispreading phase points contained in a 1-symbol time, C(i) is the dispreading code, and D(i) is the signal having undergone the spread spectrum modulation.

11. A portable terminal apparatus comprising said correlator defined in claim 1.

12. A portable telephone comprising said correlator defined in claim 1.

13. A portable terminal apparatus comprising said correlator defined in claim 2.

14. A portable terminal apparatus comprising said correlator defined in claim 3.

15. A portable terminal apparatus comprising said correlator defined in claim 4.

16. A portable terminal apparatus comprising said correlator defined in claim 5.

17. A portable terminal apparatus comprising said correlator defined in claim 6.

18. A portable terminal apparatus comprising said correlator defined in claim 7.

19. A portable terminal apparatus comprising said correlator defined in claim 8.

20. A portable terminal apparatus comprising said correlator defined in claim 9.

21. A portable terminal apparatus comprising said correlator defined in claim 10.

22. A portable telephone comprising said correlator defined in claim 2.

23. A portable telephone comprising said correlator defined in claim 3.

24. A portable telephone comprising said correlator defined in claim 4.

25. A portable telephone comprising said correlator defined in claim 5.

26. A portable telephone comprising said correlator defined in claim 6.

27. A portable telephone comprising said correlator defined in claim 7.

28. A portable telephone comprising said correlator defined in claim 8.

29. A portable telephone comprising said correlator defined in claim 9.

30. A portable telephone comprising said correlator defined in claim 10.

31. A method of correlating for performing synchronization acquisition, the method comprising:

sequentially dispreading a spread modulated signal at a plurality of synchronization point candidates, and stopping correlation computation on the basis of a value of a despreading code sequence.

32. A method according to claim 31, wherein the stopping correlation computation step independently computes a despreading computation result in advance by using an arbitrary value selected from values which a despreading code can take, thereby stopping the correlation computation when the despreading code takes the selected arbitrary value.

* * * * *